(12) United States Patent
Yoon et al.

(10) Patent No.: US 6,956,461 B2
(45) Date of Patent: Oct. 18, 2005

(54) APPARATUS AND METHOD FOR REMOTELY CONTROLLING HOUSEHOLD APPLIANCES

(75) Inventors: Sang Chul Yoon, Koyang-si (KR); Duck Goo Jeon, Seoul-si (KR); Gyeong Hae Han, Kwangmyung-si (KR)

(73) Assignee: LG Electronics Inc., Seoul (KR)

( * ) Notice: Subject to any disclaimer, the term of this patent is extended or adjusted under 35 U.S.C. 154(b) by 565 days.

(21) Appl. No.: 09/941,874

(22) Filed: Aug. 30, 2001

(65) Prior Publication Data

US 2002/0073183 A1 Jun. 13, 2002

(30) Foreign Application Priority Data

| Dec. 13, 2000 | (KR) | 2000-76115 |
| Dec. 13, 2000 | (KR) | 2000-76116 |
| Dec. 13, 2000 | (KR) | 2000-76117 |
| Dec. 13, 2000 | (KR) | 2000-76118 |
| Dec. 13, 2000 | (KR) | 2000-76119 |
| Dec. 13, 2000 | (KR) | 2000-76120 |
| Dec. 13, 2000 | (KR) | 2000-76121 |
| Dec. 13, 2000 | (KR) | 2000-76122 |
| Dec. 13, 2000 | (KR) | 2000-76123 |
| Dec. 13, 2000 | (KR) | 2000-76124 |
| Dec. 13, 2000 | (KR) | 2000-76125 |

(51) Int. Cl.$^7$ .................................. H04M 11/04
(52) U.S. Cl. ................. 340/310.01; 340/310.08; 340/825.71; 340/870.01
(58) Field of Search ............... 340/310.01, 310.08, 340/310.06, 825.71, 825.22, 825.72, 870.01, 870.16, 286.02, 310.1, 531; 709/222, 224

(56) References Cited

U.S. PATENT DOCUMENTS

| 5,321,229 | A | * | 6/1994 | Holling et al. | ............ | 219/445.1 |
| 6,199,755 | B1 | * | 3/2001 | Matsumoto et al. | ......... | 235/380 |
| 6,388,564 | B1 | * | 5/2002 | Piercy et al. | .......... | 340/310.01 |
| 6,587,739 | B1 | * | 7/2003 | Abrams et al. | ......... | 340/310.01 |

FOREIGN PATENT DOCUMENTS

| EP | 0782117 A1 | * | 2/1997 |
| JP | 02000196769 A | * | 7/2000 |

* cited by examiner

Primary Examiner—Jeffery Hofsass
Assistant Examiner—Daniel Previl
(74) Attorney, Agent, or Firm—Birch, Stewart, Kolasch & Birch, LLP

(57) ABSTRACT

An apparatus and method for remotely controlling household appliances connected to a home network. A power line and a network processor is installed in each household appliance, enabling a household appliance user to remotely control the appliances from a place outside of as well as inside a home. Information about all conditions of the household appliances can be displayed on a screen displayable household appliance so that the user can recognize the operations of the appliances even during spare moments. A low-price built-in server is installed in each household appliance to assign the corresponding appliance a unique IP address simply over the Internet to be controlled according to an external user control command. A home server is connected to each of the household appliances such that the corresponding appliance receives a control command, sent in transit by a user from a mobile terminal.

8 Claims, 10 Drawing Sheets

US 6,956,461 B2

APPARATUS AND METHOD FOR REMOTELY CONTROLLING HOUSEHOLD APPLIANCES

BACKGROUND OF THE INVENTION

1. Field of the Invention

The present invention relates in general to the remote control of household appliances, and more particularly to an apparatus and method for remotely controlling household appliances, wherein a household appliance user can control and monitor the household appliances in his or her home from a remote place outside of the home.

The present invention further relates to an apparatus and method for remotely controlling household appliances, wherein the household appliances are assigned Internet protocol (IP) addresses over the Internet in a simple manner so that they can be readily remotely controlled via the Internet.

The present invention further relates to an apparatus and method for remotely controlling household appliances, wherein a user can control the household appliances using a mobile terminal while in motion as well as using the Internet and a home network.

2. Description of the Prior Art

It is common practice that household appliances are set to perform only functions suitable for their respective purposes independently of the other appliances. Recently, techniques associated with the remote control of household appliances by a user have been developed continuously.

It is common that the remote control of household appliances is carried out through wired/wireless communication means. This generalized remote control technique is disadvantageous in that a user cannot recognize the current state of each household appliance and help operating each appliance one-sidedly.

In order to overcome such problems, a variety of efforts have recently been made to control household appliances in a wired or wireless communication manner using the Internet and communication equipment being rapidly developed.

The Internet was initially used for military and scientific purposes by a limited number of specialists. Thereafter, owing to the development of techniques related to the Internet and the easier access to the Internet, the number of Internet users has continuously increased, so the Internet related techniques have been rapidly developed. The Internet is currently used in a variety of fields, such as education, economic activities, information acquisition, etc., all over the world.

However, for connection of household appliances to the Internet, a variety of equipment must be installed and maintained at a great cost. For example, a plurality of household appliances must be assigned IP addresses for access to the Internet. To this end, a skilled user is required to perform a sequence of operations to manage each household appliance and initially assign it an IP address.

Moreover, in case of controlling household appliances using the Internet or communication equipment, a user, from a remote place outside of his or her home, cannot recognize information about the operation and other conditions of each of the household appliances and thus check such conditions.

In other words, a user can check all conditions of household appliances controllable via the Internet only after personally moving to a space in his or her home where each of the household appliances or a personal computer (PC) capable of controlling it is located, thereby actually giving no great convenience to the user.

SUMMARY OF THE INVENTION

Therefore, the present invention has been made in view of the above problems, and it is an object of the present invention to provide an apparatus and method for remotely controlling household appliances, wherein a household appliance user can control and monitor the household appliances over a power line from a remote place outside of his or her home at any time.

It is another object of the present invention to provide an apparatus and method for remotely controlling household appliances, wherein the household appliances are assigned IP addresses, respectively, and a user calls the IP addresses of the household appliances over an external communication network to gain access to the appliances, thereby enabling the user to, from even a remote place outside of his or her home, control the household appliances in the home and recognize information regarding the operations and other conditions of the appliances.

It is yet another object of the present invention to provide an apparatus and method for remotely controlling household appliances, wherein, when a fault occurs in a specific one of the household appliances capable of exchanging data with an external communication network, information regarding the fault can be automatically transferred to a service center and a user can transfer a control command to the specific household appliance through a mobile terminal from a remote place outside of his or her home.

In accordance with one aspect of the present invention, the above and other objects can be accomplished by the provision of an apparatus for remotely controlling household appliances, comprising a first network processor for performing remote communication with an external Internet network to receive external remote control information therefrom, the first network processor being connected to a home network to transmit the received remote control information to an associated one of the household appliances and receive information regarding a current state of each of the household appliances to transmit the received state information to the external Internet network; and a plurality of second network processors each connected between the output of the first network processor and the input of an associated one of the household appliances via a power line for receiving the remote control information from the first network processor and transmitting the state information of the associated household appliance to the first network processor.

In accordance with another aspect of the present invention, there is provided an apparatus for remotely controlling at least one household appliance, comprising a built-in Web server installed in the household appliance for assigning an Internet protocol (IP) address to the household appliance and extracting control information associated with the assigned IP address from a control signal sent through an external communication network; and a household appliance control unit for controlling the entire operation of the household appliance according to the control information extracted by the built-in Web server.

In accordance with a further aspect of the present invention, there is provided a method for remotely controlling at least one household appliance, comprising the steps of a) allowing a user to call an IP address of the household appliance over an Internet network to control the appliance; b) running a program for control of the household appliance in a personal computer of the user; c) allowing the user to enter a control command for the household appliance according to the program run at the step b); d) controlling the household appliance in response to the control command entered at the step c); and e) transmitting information about the entire operation of the household appliance controlled at the step d) to the user so that he or she can recognize it.

In accordance with a further aspect of the present invention, there is provided a method for remotely controlling at least one household appliance, comprising the steps of a) constructing a service provider for storing a MAC address, assigned to the household appliance upon being manufactured and sold, and assigning an IP address to the appliance on the basis of the stored MAC address; b) allowing the service provider constructed at the step a) to, when the household appliance is connected to an external communication network, sense a MAC address of the appliance and determine whether the appliance requests an IP address assignment; c) allowing the service provider to compare the MAC address sensed at the step b) with the MAC address stored at the step a) if it is determined at the step b) that the appliance requests the IP address assignment; and d) allowing the service provider to assign an IP address to the household appliance if the sensed MAC address is determined to be the same as the stored MAC address from the result compared at the step c), and to return to the step b) if the sensed MAC address is determined not to be the same as the stored MAC address.

In accordance with another aspect of the present invention, there is provided an apparatus for remotely controlling at least one household appliance, comprising a household appliance microcomputer for controlling the operations of various components in the household appliance, checking operating states of the components and generating fault/repair information in accordance with the checked results; a network processor for communicating with the household appliance microcomputer and calling a repair service over an Internet network upon receiving the fault/repair information from the microcomputer; and a communication controller connected between the household appliance microcomputer and the network processor for performing a communication processing function and signal coupling function therebetween.

In accordance with yet another aspect of the present invention, there is provided a method for remotely controlling at least one household appliance, comprising the steps of a) controlling the operations of various components in the household appliance, checking operating states of the components and generating fault/repair information upon occurrence of a fault in the appliance; b) performing a communication processing function and a signal coupling function to generate an automatic service call according to the fault/repair information generated at the step a); c) gaining access to a service center over an Internet network using a unique identification code and transmitting fault/repair records to the service center; and d) allowing the service center to receive the transmitted fault/repair records if the unique identification code is valid and then to display a reception acknowledgement message containing a visit time of a repairman and the degree of the fault.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
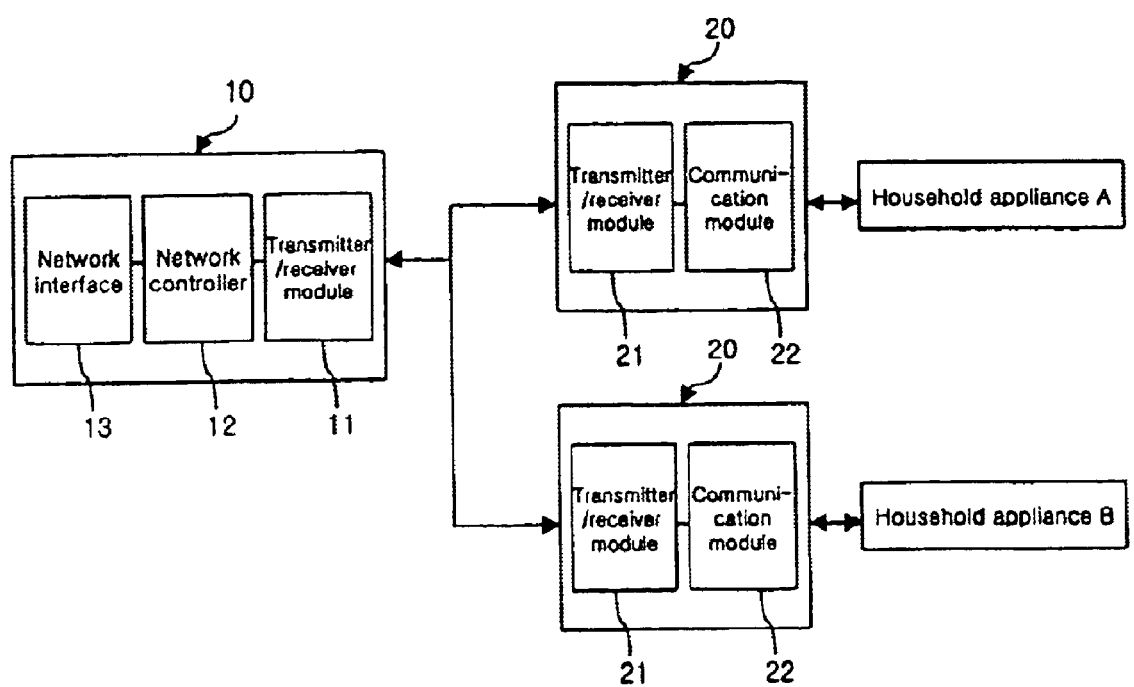
FIG. 1 is a block diagram showing the construction of a remote household appliance control apparatus in accordance with a first embodiment of the present invention.

With reference to FIG. 1, there is shown in block form the construction of a remote household appliance control apparatus in accordance with a first embodiment of the present invention. As shown in this drawing, the present remote household appliance control apparatus comprises a first network processor 10 for performing remote communication with an external Internet network to receive external remote control information therefrom. The first network processor 10 is connected to a home network to transmit the received remote control information to an associated one of household appliances and receive information regarding the current state of each of the household appliances to transmit the received state information to the external Internet network. A second network processor 20 is installed in each of the household appliances in such a manner that it is connected to the home network. The second network processor 20 is connected to the first network processor 10 via a power line to receive the remote control information from the first network processor 10 and transmit the state information of the associated household appliance to the processor 10.

The first network processor 10 includes a transmitter/receiver module 11 provided at its output stage for performing information transmission and reception operations with the second network processor 20 over the power line, and the second network processor 20 includes a transmitter/receiver module 21 provided at its input stage for performing information transmission and reception operations with the first network processor 10 over the power line.

The first network processor 10 further includes a network controller 12 for controlling the transmission and reception of the external remote control information and the state information of each of the household appliances, and a network interface 13 for interfacing the network controller 12 to the external Internet network as each of the household appliances is connected to the first network processor 10 via the second network processor 20, such that each of the household appliances communicates with the external Internet network. The first network processor 10 may preferably be an embedded communication control module.

The second network processor 20 further includes a communication module 22 for processing the remote control information received from the first network processor 10 and the state information of the associated household appliance to be transmitted to the processor 10 and performing the same functions as those of the network controller 12 and network interface 13 of the processor 10. The second network processor 20 may preferably be an embedded communication control module.

In that the transmitter/receiver modules 11 and 21 in the first and second network processors 10 and 20 are interconnected via the power line, a user of the household appliances can remotely control the appliances over the power line in even a place outside of his or her home. That is, the second network processors 20 installed respectively in the household appliances A and B are interconnected via the power line, thus setting up a network environment of serial communication. Then in the first network processor 10, the network interface 13 interfaces the household appliances A and B to the external Internet network, and the network controller 12 controls the appliances according to remote control information received from the external Internet network.

In more detail, the first network processor 10 transmits the remote control information received from the external Internet network to the transmitter/receiver modules 21 in the second network processors 20 via its transmitter/receiver module 11 and the power line. Then, the communication modules 22 in the second network processors 20 process and analyze the remote control information transmitted from the first network processor 10, thereby enabling the remote control operation to be performed for only a household appliance matched with a product name based on the analyzed results.

Upon receiving the remote control information from the processor 10, the second network processor 20 in the associated household appliance generates a transmission acknowledgement message and transmits the generated message to the first network processor 10 via its transmitter/receiver module 21. Subsequently, the first network processor 10 transmits the transmission acknowledgement message from the second network processor 20 over the external Internet network to the user who has entered the remote control information for the associated household appliance. As a result, the user can recognize that the remote control information has been accurately transmitted to a desired household appliance.

In the first embodiment, the communication modules 22 in the second network processors 20 are connected directly to a network constructed among the household appliances using the power line, in order to generate information about operating states of the associated household appliances and user notification information according to characteristics of the appliances. In this connection, a screen display communication module 23 is installed in the second network processor 20 of a screen displayable one of the household appliances to collect the operating state information and user notification information generated by the communication modules 22, analyze the collected information and display the analyzed results on a screen of the displayable household appliance to provide a visual indication thereof to the user.

Figure 2:
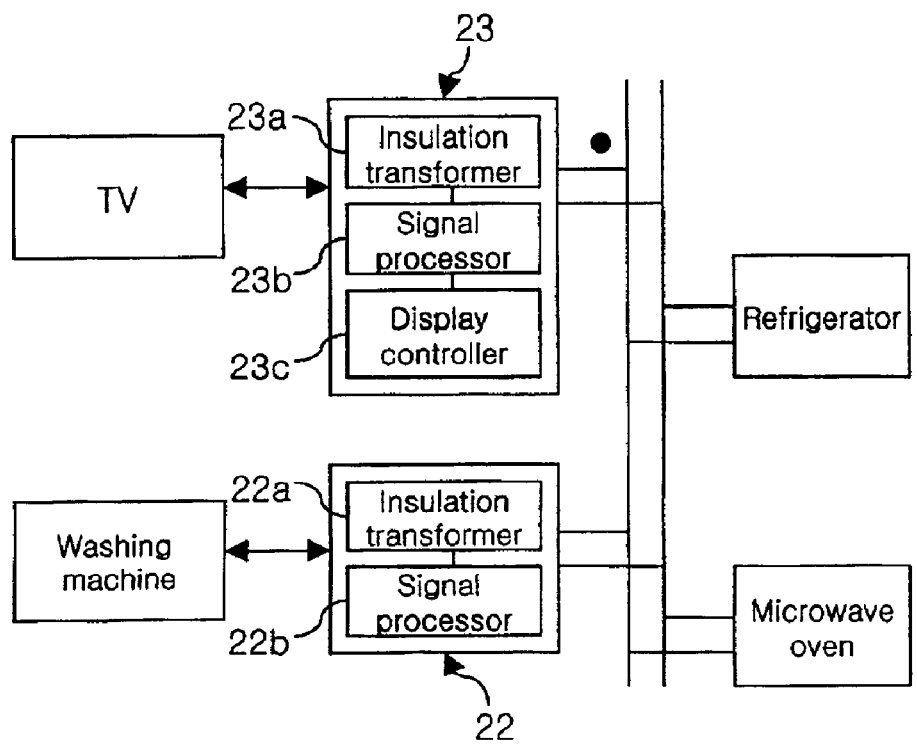
FIG. 2 is a detailed block diagram of communication modules in FIG. 1.

Each of the communication modules 22 includes, as shown in FIG. 2, an insulation transformer 22a for performing a signal transformation operation to smooth the flow of information between the associated household appliance and the power line, and a signal processor 22b for generating the operating state information of the associated household appliance and user notification information according to the characteristics of the appliance, appending a unique code assigned to the associated household appliance to the generated operating state information and user notification information, transmitting the resulting information through the insulation transformer 22a, receiving the remote control information through the insulation transformer 22a, extracting the unique code from the received remote control information and then processing the remote control information.

The screen display communication module 23 includes, as shown in FIG. 2, an insulation transformer 23a for performing a signal transformation operation to smooth the flow of information between the associated household appliance and the power line, and a signal processor 23b for generating the operating state information of the associated household appliance and user notification information according to the characteristics of the appliance, appending a unique code assigned to the associated household appliance to the generated operating state information and user notification information, transmitting the resulting information through the insulation transformer 23a, receiving the remote control information through the insulation transformer 23a, extracting the unique code from the received remote control information and then processing the remote control information. The signal processor 23b is further adapted to collect the operating state information and user notification information generated by the communication modules 22 through the insulation transformer 23a and extract the unique codes assigned respectively to the household appliances associated with the modules 22 from the collected information. The screen display communication module 23 further includes a display controller 23c for converting the operating state information and user notification information collected by the signal processor 23b into text data and displaying the converted text data on the screen according to the unique codes extracted by the processor 23b. The screen display communication module 23 further includes means for analyzing the user notification information and flickering the text data displayed on the screen or varying the color thereof if the analyzed result indicates an urgent situation, thereby enabling the user to recognize the urgent situation.

The communication modules 22 and screen display communication module 23 are installed respectively in household appliances at home, such as a refrigerator, microwave oven, washing machine, TV, etc., in such a manner that they are interconnected via the power line.

For example, in the communication module 22 installed in the washing machine in FIG. 2, the signal processor 22b generates information regarding an operating state of the washing machine and user notification information according to characteristics of the machine, appends a unique code assigned to the washing machine to the generated operating state information and user notification information and transmits the resulting information to the power line through the insulation transformer 22a.

Thereafter, in the screen display communication module 23 installed in the TV, the signal processor 23b collects operating state information and user notification information, transmitted from various household appliances via the power line, through the insulation transformer 23a, extracts unique codes assigned respectively to the household appliances from the collected information and transfers the extracted unique codes and the collected information to the display controller 23c. The display controller 23c converts the operating state information and user notification information collected by the signal processor 23b into text data and displays the converted text data on the lower part of a screen of the TV according to the unique codes extracted by the processor 23b.

At this time, the screen display communication module 23 analyzes the user notification information and flickers the text data displayed on the screen or varies the color thereof if the analyzed result indicates an urgent situation. Therefore, while watching the TV, the user can operate the household appliances and easily recognize an operating state of the washing machine, an indoor temperature of the refrigerator, an operating state of the microwave oven, etc., from texts displayed on the lower part of the TV screen.

Figure 3:
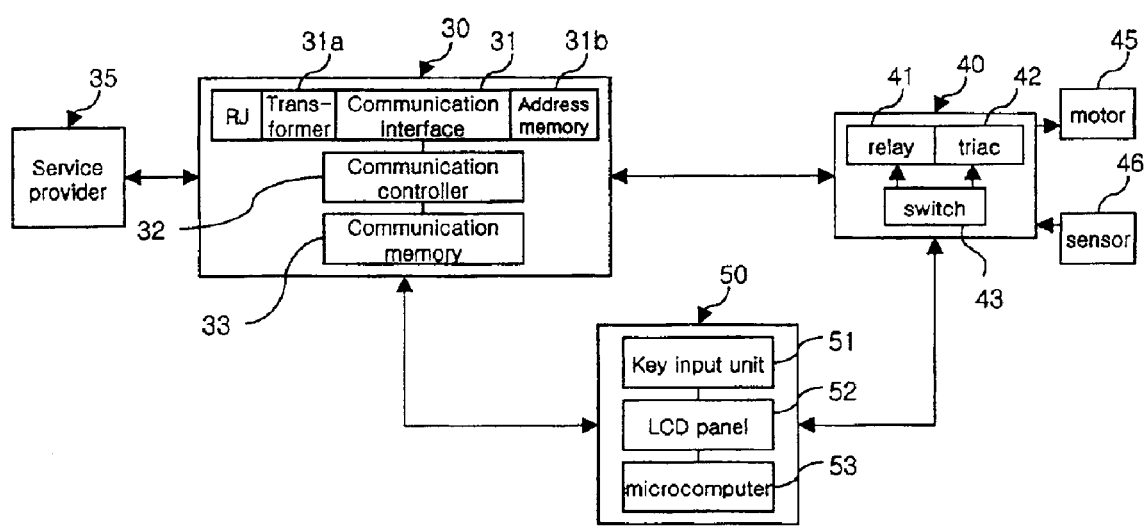
FIG. 3 is a block diagram showing the construction of a remote household appliance control apparatus in accordance with a second embodiment of the present invention.

With reference to FIG. 3, there is shown in block form the construction of a remote household appliance control apparatus in accordance with a second embodiment of the present invention. As shown in this drawing, the remote household appliance control apparatus comprises a built-in Web server 30 installed in a household appliance for assigning an Internet protocol (IP) address to the household appliance and extracting control information associated with the assigned IP address from a control signal sent through an external communication network, and a household appliance control unit 40 for controlling the entire operation of the household appliance according to the control information extracted by the built-in Web server 30.

The built-in Web server 30 includes a communication interface 31 for interfacing the household appliance to the external communication network, a communication controller 32 for receiving the control signal through the communication interface 31 and extracting the control information from the received control signal, and a communication memory 33 for storing a program for processing the control information extracted by the communication controller 32 and transferring the processed control information to the household appliance.

The communication interface 31 may preferably be provided with an Ethernet controller for authenticating and managing, for example, a washing machine control signal sent through an Internet network. In the present embodiment, the communication interface 31 includes a transformer 31a connected to the external communication network through a registered jack (RJ)-45 for access to the Internet, for performing a signal transformation operation such that the control information is extracted from the control signal sent through the external communication network.

The communication memory 33 may preferably be a flash memory. The communication controller 32 controls the interface to the external communication network by the communication interface 31 and processes communication protocols, such as an Internet protocol (IP), Internet control message protocol (ICMP), transmission control protocol (TCP) and Hypertext Transfer Protocol (HTTP), at high speed, according to a graphic user interface (GUI) program and Java program stored in the communication memory 33.

Different programs may be stored in the communication memory 33 according to the types of household appliances where the built-in Web server 30 is installed. Additional programs may be stored in the communication memory 33 to control the communication interface or process the control information in response to a request from the user.

The household appliance control unit 40 includes drive means for driving the household appliance as needed. For example, the drive means may be provided with a relay 41 or triac 42 for operating a lamp or curtain at home under control of the user in a remote place outside of his or her home, and a switch 43 for controlling the relay 41 or triac 42 according to external control information.

In case the user enters a control signal capable of controlling a lamp or curtain in his or her home, which is a household appliance assigned an IP address by the built-in Web server 30, over an external communication network, or Internet network, the Web server 30 extracts control information associated with the assigned IP address from the entered control signal and transfers the extracted control information to the household appliance control unit 40 such that the control unit 40 controls the household appliance according to the control information.

The household appliance control unit 40 generates information about the operation of the household appliance and transfers the generated information to the communication controller 32 in the built-in Web server 30, which in turn transmits the operation information of the appliance to the user through the communication interface 31 and external communication network.

In the second embodiment, the remote household appliance control apparatus further comprises a display processor 50 for displaying information about the entire operation of the household appliance, controlled by the household appliance control unit 40 according to the control information extracted by the built-in Web server 30.

The display processor 50 includes a key input unit 51 (for example, a touch screen) for inputting a key command signal according to a user's key operation, a liquid crystal display (LCD) panel 52 for displaying information about the entire operation of the household appliance controlled according to the key command signal inputted by the key input unit 51 and the control information extracted by the Web server 30, and a microcomputer 53 for processing the operation information of the household appliance and displaying the processed information on the LCD panel 52.

For example, assume that the household appliance control unit 40 controls a washing machine as a household appliance. In this case, the control unit 40 controls a motor 45, which is washing machine drive means, according to the control information transferred from the built-in Web server 30. While controlling the washing machine, the control unit 40 senses the entire operation of the washing machine through a sensor 46 and generates information regarding the sensed operation.

The microcomputer 53 in the display processor 50 processes the information generated by the household appliance control unit 40 such that it is displayable on the LCD panel 52. The microcomputer 53 then displays the processed information on the LCD panel 52. In addition to the information regarding the entire operation of the washing machine controlled according to the control information transferred from the built-in Web server 30, the microcomputer 53 displays the transferred control information directly on the LCD panel 52.

Further, the information about the entire operation of the washing machine displayed on the LCD panel 52 is processed by the communication controller 32 in the built-in Web server 30 and then sent to the external user via the communication interface 31. As a result, the external user can check the information regarding the entire operation of the washing machine through a main screen picture of a computer in which he or she has entered the control command to transmit the control signal to the built-in Web server 30.

Figure 4:
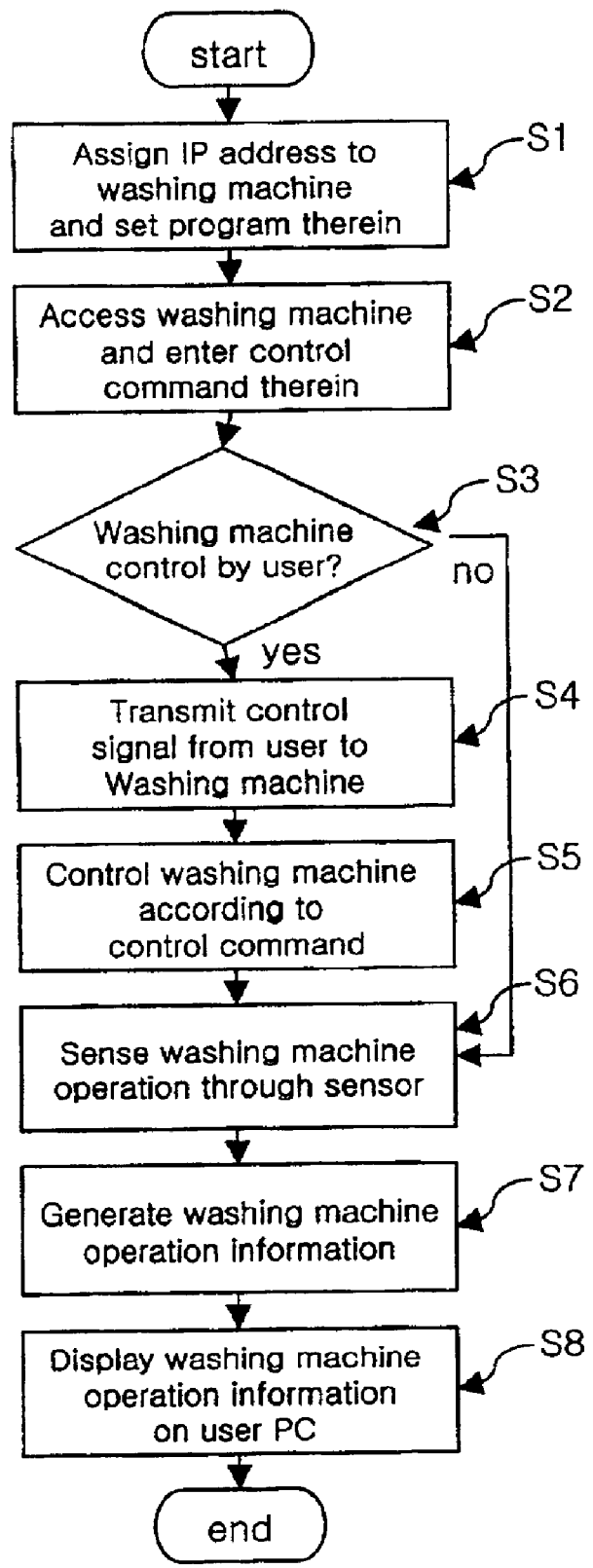
FIG. 4 is a flowchart illustrating a washing machine control method in accordance with the second embodiment of the present invention.

FIG. 4 is a flowchart illustrating a method for controlling a washing machine using the remote household appliance control apparatus with the above-stated construction in accordance with the second embodiment of the present invention.

At the first step S1, an IP address is assigned to the washing machine and a GUI program or Java program is set in the machine for the process of control information for the machine, received over an external communication network.

At the second step S2, a user of the washing machine gains access to the Internet through a PC and calls the IP address assigned to the washing machine at the above first step S1 to access the machine. If the washing machine is accessed by the user, then the set program runs in the PC to enter a control command in the machine.

A determination is made at the third step S3 as to whether the user has entered a control command for the washing machine at the above second step S2.

Upon determining at the above third step S3 that the user has entered the control command, a washing machine control signal containing the entered control command is transmitted to the washing machine at the fourth step S4.

At the fifth step S5, the washing machine control information, or the control command, is extracted from the control signal transmitted at the above fourth step S4 and the washing machine is controlled in operation according to the extracted control information.

On the other hand, in the case where it is determined at the above third step S3 that the user has entered no control command for the washing machine, or after the washing machine is controlled in operation at the above fifth step S5, the entire operation of the machine is sensed at the sixth step S6.

Then, information about the entire operation of the washing machine sensed at the sixth step S6 is generated at the seventh step S7.

At the eighth step S8, the information generated at the above seventh step S7 is processed by the built-in Web server such that it is transmittable via the external communication network, and then transmitted to the user over the external communication network. As a result, the transmitted information is displayed on a monitor of the PC or a display panel of the washing machine so that it can be checked by the user.

Besides, in the remote household appliance control apparatus of the second embodiment, the communication interface 31 further includes an address memory 31b for storing MAC address information for identification of household appliances and IP addresses assigned respectively to the appliances through the built-in Web server 30 on the basis of the MAC address information. The remote household appliance control apparatus further comprises a service provider 35 for assigning the IP addresses respectively to the household appliances on the basis of the MAC address information of the appliances stored in the addresses memory 31b. As long as the user recognizes a MAC address and IP address of a desired household appliance, he or she can remotely control the household appliance over the Internet and external communication network at any place all over the world.

Each household appliance is assigned a MAC address when it is manufactured. The MAC address is a 48-bit address composed of the first-half 24 bits indicative of a company number and the latter-half 24 bits indicative of an inherent number of the household appliance. In this regard, the MAC address is inherent information assigned to only one household appliance in the world. An IP address is a physical network address assigned for efficient routing on the Internet, which is composed of 32 bits.

The service provider 35 is adapted to, when each household appliance is connected to the external communication network via the built-in Web server 30, sense each MAC address stored in the address memory 31b in the Web server 30 and assign an IP address to each appliance on the basis of the sensed MAC address.

In more detail, when household appliances are manufactured, corresponding MAC addresses are stored in the household appliances, and the service provider 35 is constructed to assign IP addresses respectively to the appliances. In response to a request from the user or when a certain household appliance is connected to the external communication network, the service provider 35 recognizes a MAC address of the connected household appliance and determines whether the appliance has been assigned an IP address.

It should be noted that the service provider 35 prestores MAC addresses of household appliances to which IP addresses are to be assigned. In this connection, the service provider 35 senses a MAC address of the connected household appliance and assigns an IP address to the appliance only when the sensed MAC address is the same as a prestored MAC address.

Thereafter, the IP address assigned to the household appliance is stored in the address memory 31b having the MAC address prestored therein. As a result, the built-in Web server 30 extracts control information associated with the household appliance from a control command, entered by the user over the external communication network, on the basis of the IP address assigned to the appliance and then transfers the extracted control information to the appliance so that the appliance can be controlled in operation according to that control information.

Figure 5:
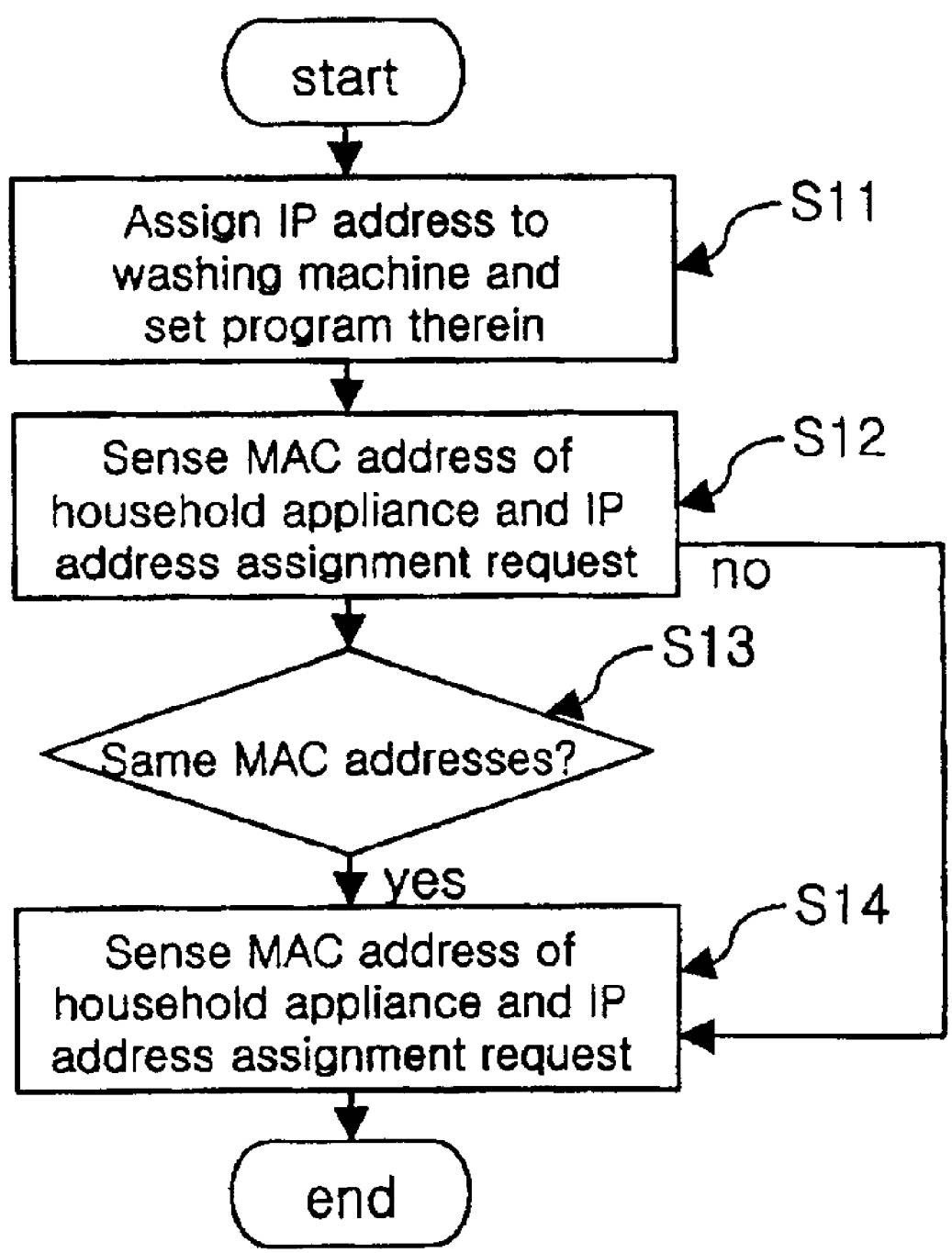
FIG. 5 is a flowchart illustrating a method for assigning an IP address to a household appliance in accordance with the second embodiment of the present invention.

FIG. 5 is a flowchart illustrating a method for assigning an IP address to a household appliance in accordance with the second embodiment of the present invention.

First, at the eleventh step S11, a service provider is constructed to store information about a MAC address assigned to a manufactured and sold household appliance, sense a MAC address of the appliance when the appliance is connected to an external communication network, and assign an IP address to the appliance on the basis of the sensed MAC address.

At the twelfth step S12, in response to a request from the user or when the household appliance is connected to the external communication network, the service provider constructed at the above eleventh step S11 senses a MAC address of the connected household appliance and determines whether the appliance requests an IP address assignment under the condition that it is assigned no IP address.

Upon determining at the above twelfth step S12 that the household appliance requests the IP address assignment, the service provider determines at the thirteenth step S13 whether the MAC address sensed at the twelfth step S12 is the same as that stored at the above eleventh step S11.

Where the sensed MAC address is determined to be the same as the stored MAC address at the above thirteenth step S13, the service provider assigns a unique IP address to the household appliance and stores the assigned IP address in an address memory, at the fourteenth step S14. Therefore, the household appliance is externally identifiable when it is connected to the external communication network.

On the other hand, in the case where it is determined at the above thirteenth step S13 that the sensed MAC address is not the same as the stored MAC address, the service provider assigns no IP address to the household appliance and then returns to the above twelfth step S12.

Figure 6:
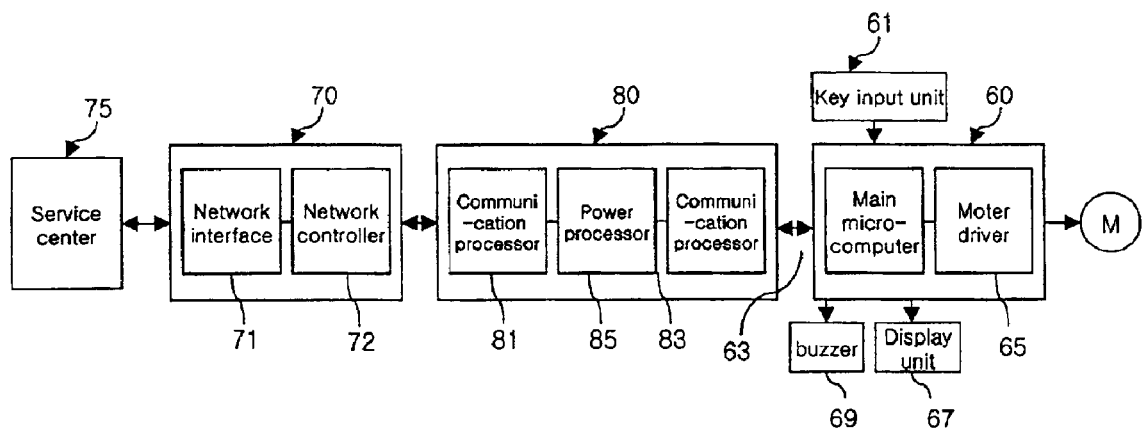
FIG. 6 is a block diagram showing the construction of a remote household appliance control apparatus in accordance with a third embodiment of the present invention.

FIG. 6 is a block diagram showing the construction of a remote household appliance control apparatus in accordance with a third embodiment of the present invention. As shown in this drawing, the remote household appliance control apparatus comprises a household appliance microcomputer 60 for controlling the operations of various components in a household appliance, checking operating states of the components and generating fault/repair information in accordance with the checked results, a network processor 70 for communicating with the household appliance microcomputer 60 and calling a repair service over an Internet network upon receiving the fault/repair information from the microcomputer 60, and a communication controller 80 connected between the household appliance microcomputer 60 and the network processor 70 for performing a communication processing function and signal coupling function therebetween.

The household appliance microcomputer 60 includes a key input unit 61 for inputting a key command signal according to a user's key operation, a main microcomputer 63 for controlling the operations of the various components in the household appliance in response to the key command signal inputted by the key input unit 61 or external control information transferred from the network processor 70, checking the operating states of the components and generating the fault/repair information upon detecting a fault as a result of the checking, a motor driver 65 for driving household appliance drive means M under the control of the main microcomputer 63, a display unit 67 for displaying the operating states of the components under the control of the main microcomputer 63, and a buzzer 69 for generating a specific sound according to a specific operating state of the household appliance. Provided that the third embodiment of the present invention is applied to a washing machine, the drive means M will be a motor.

The network processor 70 includes a network interface 71 for interfacing the household appliance to the Internet network, and a network controller 72 for communicating with the household appliance microcomputer 60 via the communication controller 80, calling a service center 75 for the repair service upon receiving the fault/repair information from the microcomputer 60, and transmitting and receiving a variety of information over the Internet network.

The communication controller 80 includes a pair of serial communication processors 81 and 83 connected respectively to the network processor 70 and household appliance microcomputer 60 for performing the communication processing function therebetween, and a power processor 85 connected between the serial communication processors 81 and 83 for performing a power ON/OFF function to prevent a mismatch between a power line and a signal line.

Figure 7:
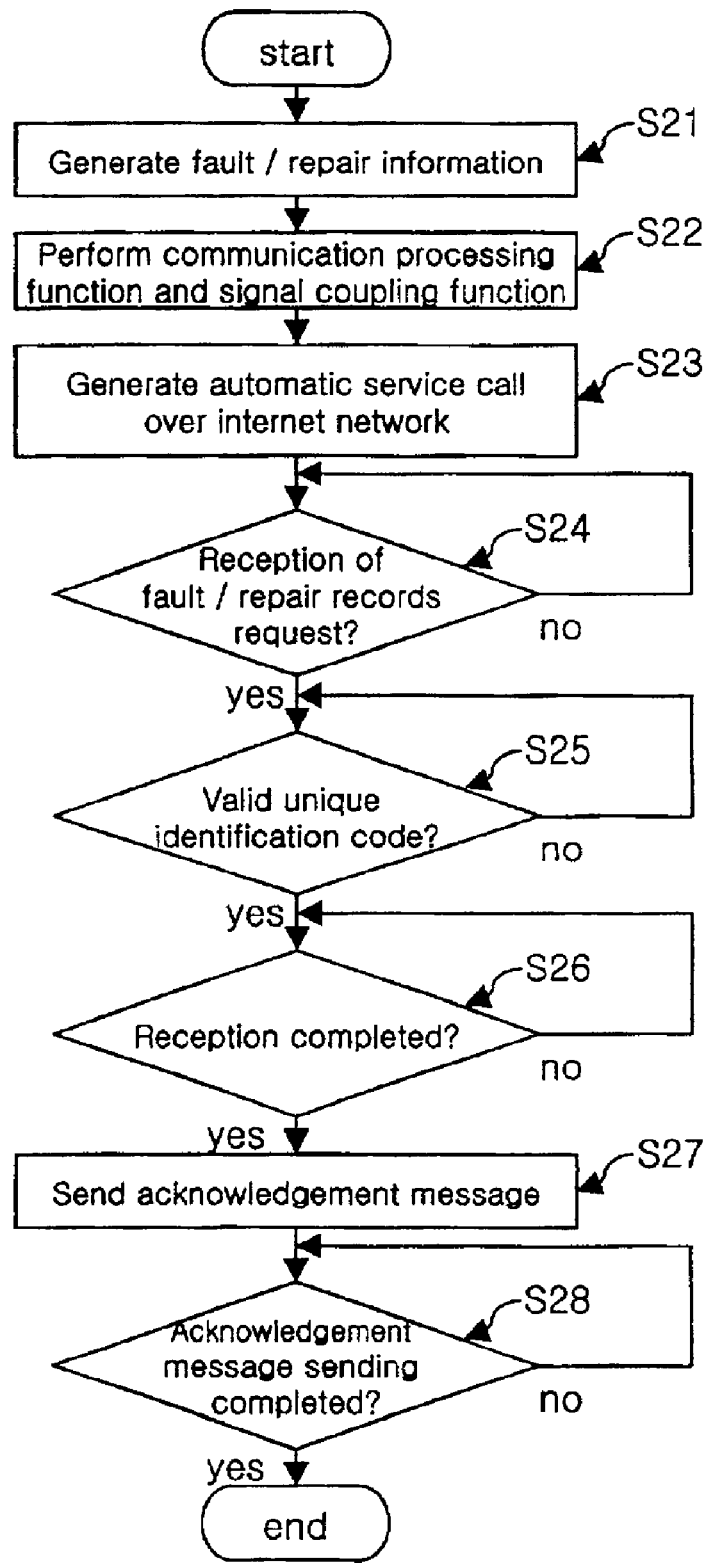
FIG. 7 is a flowchart illustrating a method for, through the remote household appliance control apparatus of FIG. 6, controlling a washing machine and receiving fault/repair records of the washing machine.

FIG. 7 is a flowchart illustrating a method for, through the remote household appliance control apparatus of FIG. 6, controlling a washing machine and receiving fault/repair records of the washing machine.

First, at the twenty-first step S21, the household appliance microcomputer generates the fault/repair information upon occurrence of a fault in the washing machine.

At the twenty-second step S22, the communication controller performs the communication processing function and signal coupling function between the household appliance microcomputer and the network processor such that the network processor generates an automatic service call according to the fault/repair information generated at the above twenty-first step S21.

At the twenty-third step S23, the network processor gains access to the service center over the Internet network using a unique identification code, thereby automatically calling the service center for the repair service.

At the twenty-fourth step S24, the service center determines whether the reception of fault/repair records is requested. Upon determining that the fault/repair record reception is not requested, the service center checks the reception request continuously. However, where the fault/repair record reception is determined to be requested, the service center determines at the twenty-fifth step S25 whether the unique identification code from the network processor is valid.

In the case where it is determined at the above twenty-fifth step S25 that the unique identification code from the network processor is valid, the service center receives the fault/repair records from the washing machine and determines at the twenty-sixth step S26 whether the record reception has been completed.

If the fault/repair record reception has been completed at the above twenty-sixth step S26, the service center sends an acknowledgement message to the washing machine at the twenty-seventh step S27. At this time, the acknowledgement message may contain information regarding a visit time of a repairman or the degree of the fault such that the information is displayed on the washing machine.

At the twenty-eighth step S28, the household appliance microcomputer determines whether the sending of the acknowledgement message from the service center has been completed. In case the message sending has been completed, the household appliance microcomputer ends the remote fault diagnosis process. However, where the message sending has not been completed, the microcomputer waits until it is completed and then ends the remote fault diagnosis process.

Here, the above twenty-fourth to twenty-sixth steps S24 through S26 represent a reception path to the service center. Also, the service center stores the fault records of the washing machine corresponding to the unique identification code in a database.

Figure 8:
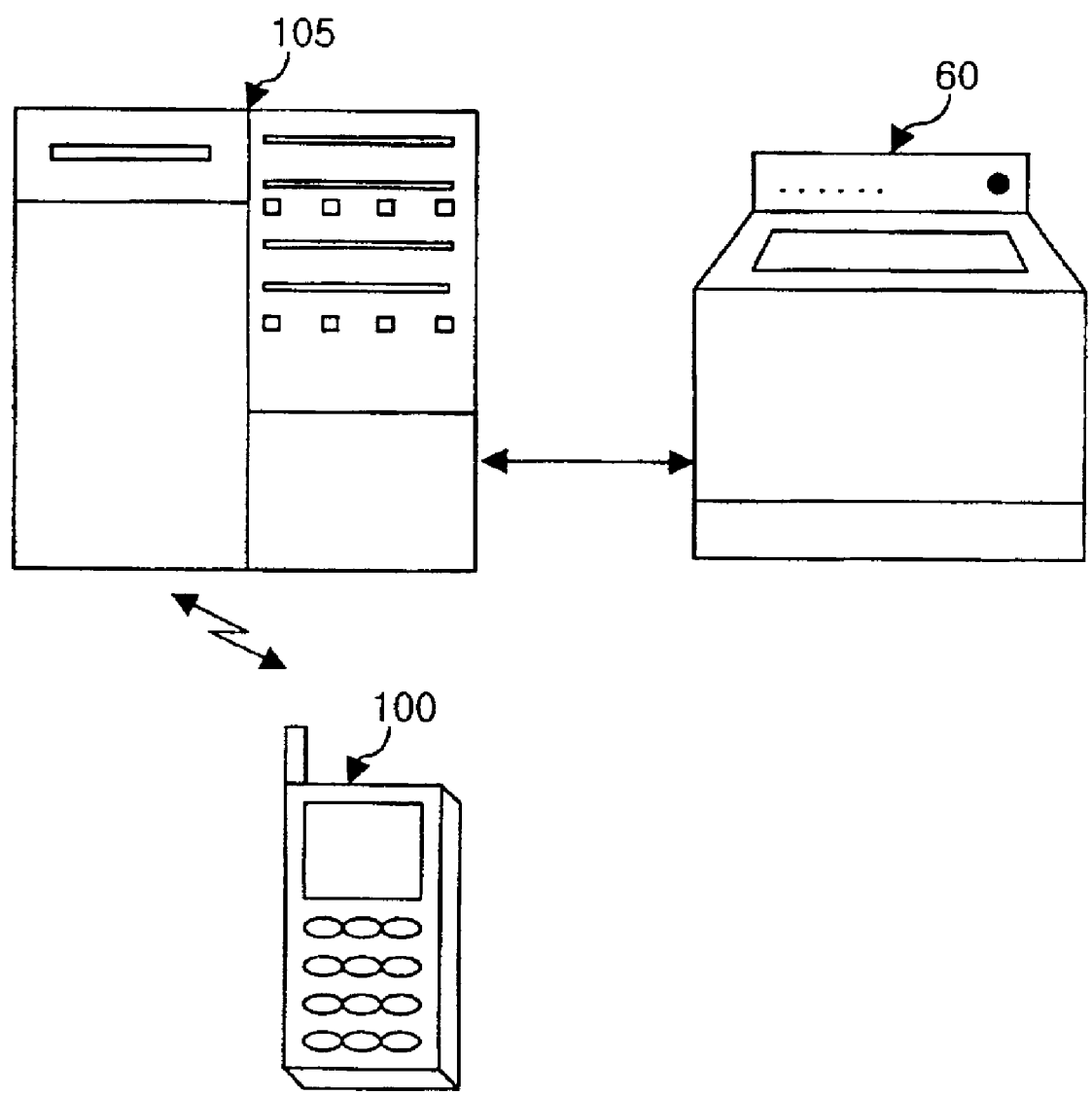
FIG. 8 is a view showing the construction of a household appliance which is controlled through a mobile terminal in accordance with the third embodiment of the present invention.
Figure 9A:
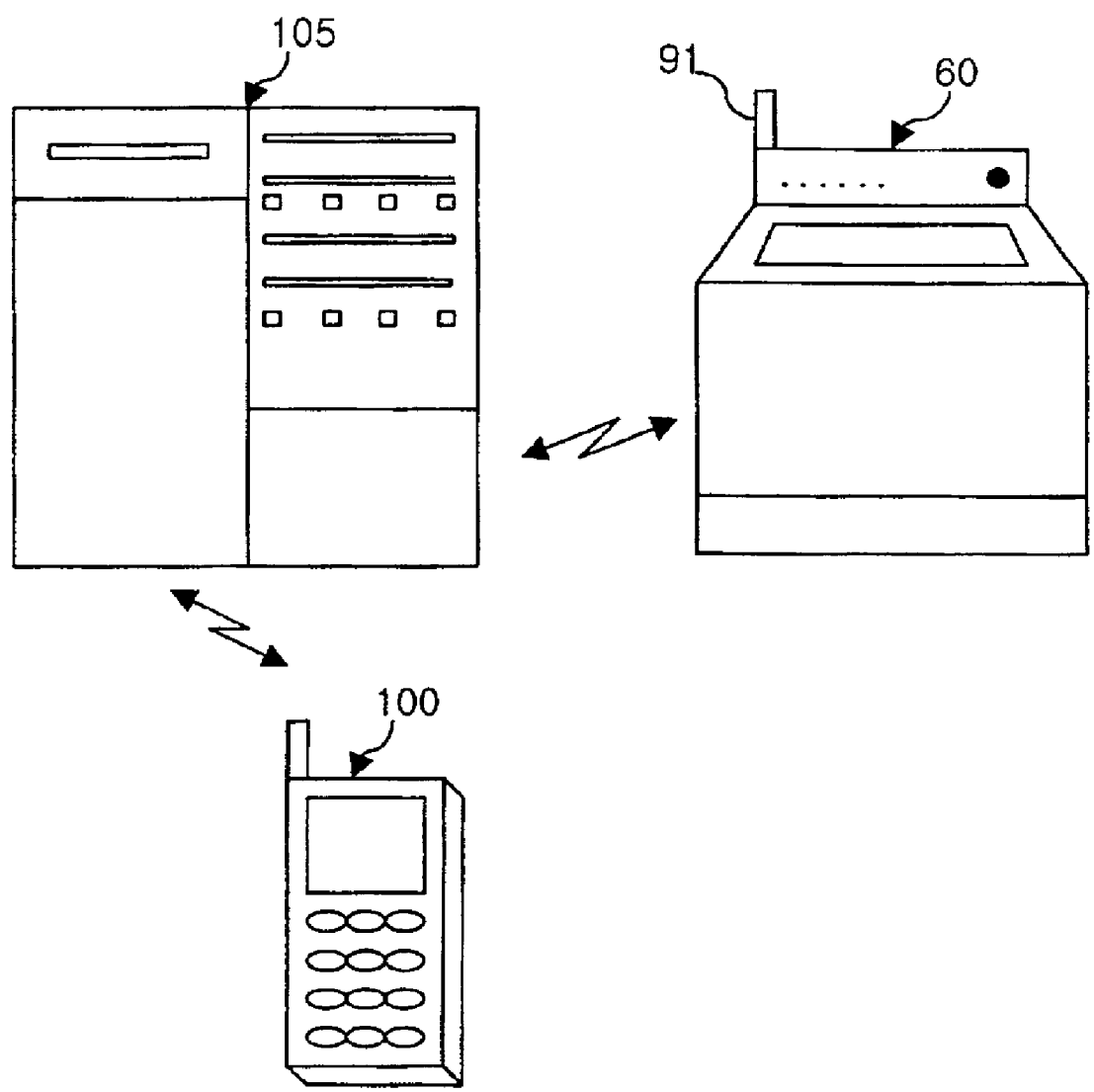
FIGS. 9a and 9b are views showing the construction of a household appliance which is wirelessly controlled through a mobile terminal in accordance with the third embodiment of the present invention.
Figure 10:
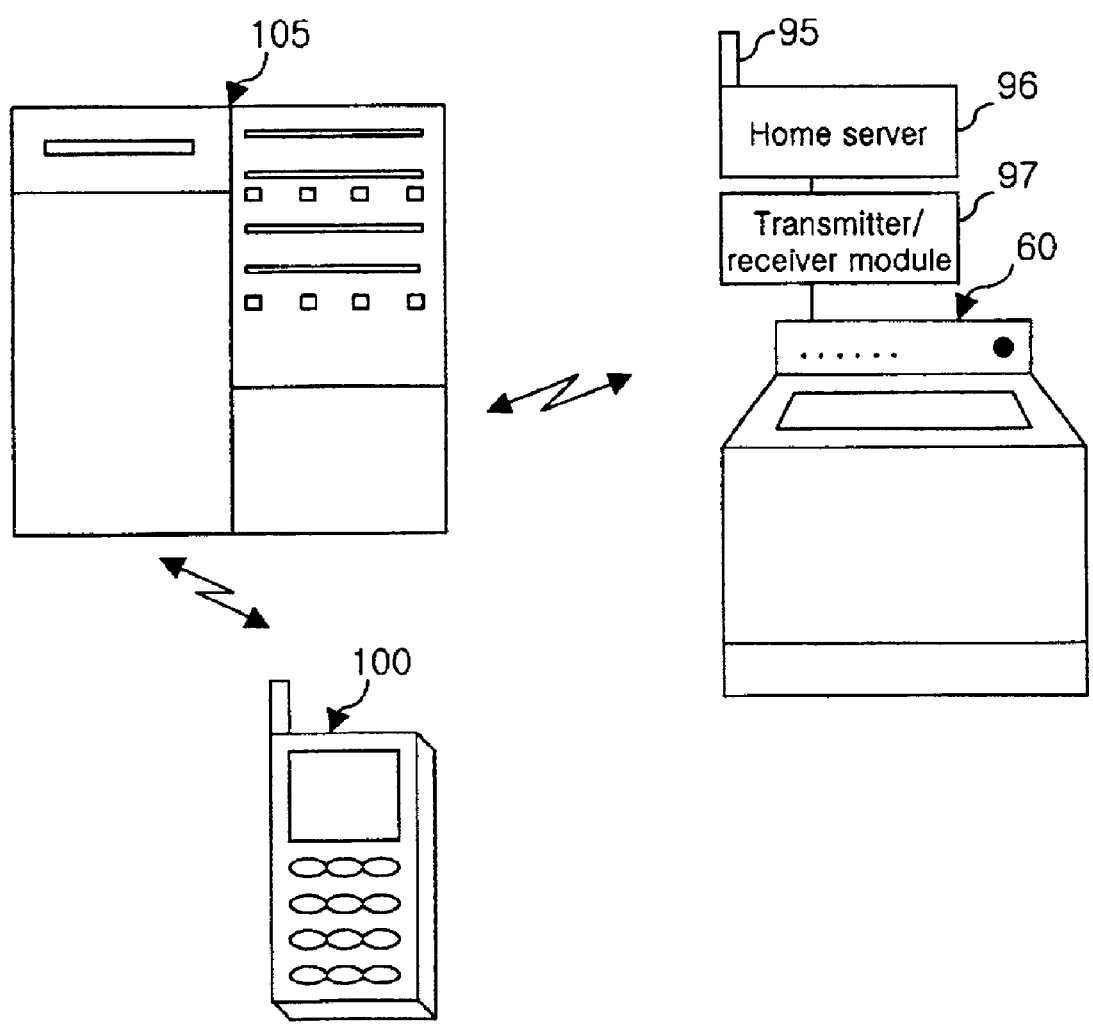
FIG. 10 is a view showing the construction of a household appliance which has a home server and is wirelessly controlled through a mobile terminal in accordance with the third embodiment of the present invention.

Also in the third embodiment of the present invention, as shown in FIGS. 8, 9a and 10, the household appliance microcomputer 60 in the remote household appliance control apparatus is adapted to check the operation of the household appliance and generate information about the use of the appliance as a result of the checking, and the network processor is adapted to transmit and receive a variety of control information, containing the use information generated by the microcomputer 60, over the Internet network. The remote household appliance control apparatus further comprises a communication terminal 100 for calling the household appliance to transmit remote control information from the user to the appliance, and a communication service provider 105 for accommodating the user as a subscriber of the communication terminal 100 and transmitting the remote control information from the user to the household appliance with the communication controller.

The communication service provider 105 may preferably be an Internet service provider (ISP). The service provider 105 is adapted to communicate with the subscriber of the communication terminal 100. Moreover, the service provider 105 is connected to the network processor 70 of the household appliance to support the transmission of the remote control information from the user to the appliance through the communication terminal 100.

As shown in FIG. 8, the communication terminal 100 and communication service provider 105 are interconnected wirelessly and the communication service provider 105 and household appliance are interconnected via a wired cable.

Alternatively, as shown in FIG. 9a, the communication terminal 100 and communication service provider 105 may be interconnected wirelessly and the communication service provider 105 and household appliance may be interconnected wirelessly, too.

Figure 9B:
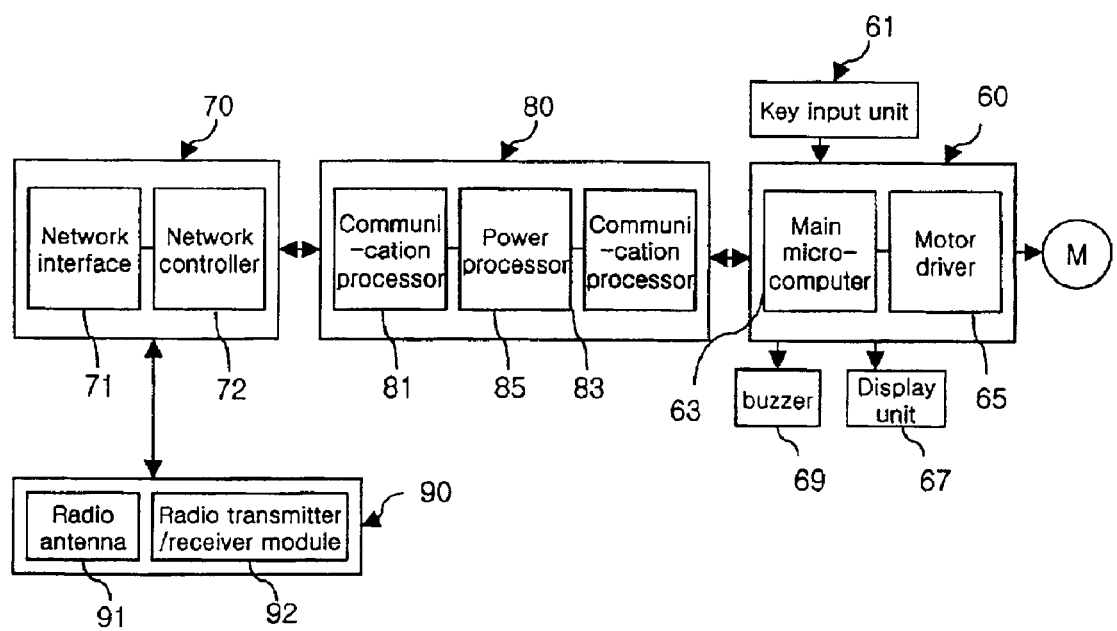

For the wireless connection to the communication service provider 105, the household appliance includes, as shown in FIG. 9b, a radio antenna 91 for transmitting and receiving radio communication data, such as the user's remote control information, to/from the communication service provider 105, and a radio transmitter/receiver module 92 connected to the network interface 71 in the network processor 70 for processing the radio communication data transmitted and received between the radio antenna 91 and the network processor 70.

On the other hand, as shown in FIG. 10, under the condition that the communication terminal 100 and communication service provider 105 are interconnected wirelessly and the communication service provider 105 and household appliance are also interconnected wirelessly, the household appliance may include an antenna 95, home server 96 and transmitter/receiver module 97 instead of the radio antenna 91 and radio transmitter/receiver module 92.

The antenna 95 of the household appliance acts to transmit and receive radio communication data to/from the communication service provider. The home server 96 acts as a relay between the external Internet network and the home network to connect the radio communication data, transmitted and received through the antenna 95, to the home network. The transmitter/receiver module 97 is connected to the household appliance via a network transfer medium to transfer information between the home server 96 and the appliance.

The network transfer medium may preferably be an Internet dedicated line, such as an asymmetric digital subscriber line (ADSL).

A detailed description will hereinafter be given of the operation of the remote household appliance control apparatus with the above-stated construction in accordance with the third embodiment of the present invention.

As long as the user subscribes to the specific communication service provider 105, he or she can remotely control the washing machine using the communication terminal 100 with a dedicated line from a place outside of his or her home. At this time, the user generates remote control information using the communication terminal 100, and the communication service provider 105 transmits the generated remote control information to the household appliance microcomputer 60 via the network processor 70 and communication controller 80, so as to control the operation of the washing machine.

Provided that the communication service provider 105 is connected to the washing machine via the wired cable as shown in FIG. 8, it will transmit the remote control information from the user directly to the network processor 70.

Alternatively, in case the communication service provider 105 transmits the remote control information from the user to the washing machine in the form of radio communication data as shown in FIG. 9b, the transmitted radio communication data is transferred to the network processor 70 via the radio antenna 91 and radio transmitter/receiver module 92.

As another alternative, where the communication service provider 105 transmits the remote control information from the user to the antenna 95 in the form of radio communication data as shown in FIG. 10, the transmitted radio communication data is received through the antenna 95 and then transferred to the home network via the home server 96. Thereafter, the communication data is transferred to the network processor 70 via the home server 96, transmitter/receiver module 97 and network transfer medium.

According to the present invention, an operating system, operating system drive memory and display of the washing machine are omitted and the network processor 70 and communication controller 80 of the embedded type having the simple Internet network connection function are additionally provided in the washing machine, thereby enabling the reception of remote control information sent from the user using the communication terminal.

Further, data can be transferred between the communication service provider 105 and the washing machine in a wired or wireless manner. In this specification, a wired technique and various wireless techniques employing the antennas 91 and 95, transmitter/receiver modules 92 and 97 and home server 96 are disclosed. Other than those, a variety of wired or wireless techniques may be implemented by providing simple equipment in addition to such elements.

As apparent from the above description, the present invention provides an apparatus and method for remotely controlling household appliances, wherein the household appliances are connected to a home network based on a power line and a network processor is installed in each of the household appliances, thereby enabling a household appliance user to remotely control the appliances from a place outside of his or her home as well as inside. Further, information about all conditions of the household appliances can be displayed on a screen displayable one of the household appliances so that the user can recognize the operations of the appliances even during spare moments. Moreover, a lowprice built-in server is installed in each of the household appliances such that the corresponding appliance is assigned a unique IP address simply over the Internet and controlled according to an external control command from the user. Furthermore, a home server is connected to each of the household appliances such that the corresponding appliance receives a control command, sent from the user using a mobile terminal. Therefore, the user can control the household appliances even while in motion.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for remotely controlling household appliances, comprising:

a first network processor for performing remote communication with an external Internet network to receive external remote control information therefrom, said first network processor being connected to a home network to transmit the received remote control information to an associated one of said household appliances and receive information regarding a current state of each of said household appliances to transmit the received state information to said external Internet network; and a plurality of second network processors each connected between the output of said first network processor and the input of an associated one of said household appliances via a power line for receiving said remote control information from said first network processor and transmitting the state information of the associated household appliance to said first network processor.

2. The apparatus as set forth in claim 1, wherein said first network processor includes a transmitter/receiver module provided at its output stage for performing information transmission and reception operations with said second network processors over said power line, and each of said second network processors includes a transmitter/receiver module provided at its input stage for performing information transmission and reception operations with said first network processor over said power line.

3. The apparatus as set forth in claim 1, wherein each of said second network processors includes a communication module installed in the associated household appliance and connected directly to said home network constructed among said household appliances using said power line, for generating information about an operating state of the associated household appliance and user notification information according to characteristics of the associated appliance.

4. The apparatus as set forth in claim 3, wherein a specific one of said second network processors includes a screen display communication module installed in a screen displayable one of said household appliances for collecting the operating state information and user notification information generated by said communication modules, analyzing the collected information and displaying the analyzed results on a screen of the displayable household appliance to provide a visual indication thereof to a user.

5. The apparatus as set forth in claim 3, wherein each of said communication modules includes:

an insulation transformer for performing a signal transformation operation to smooth the flow of information between the associated household appliance and said power line; and a signal processor for generating the operating state information of the associated household appliance and user notification information according to the characteristics of the associated appliance, appending a unique code assigned to the associated household appliance to the generated operating state information and user notification information, transmitting the resulting information through said insulation transformer, receiving said remote control information through said insulation transformer, extracting said unique code from the received remote control information and then processing said remote control information.

6. The apparatus as set forth in claim 4, wherein said screen display communication module includes:

an insulation transformer for performing a signal transformation operation to smooth the flow of information between said specific household appliance and said power line; and a signal processor for generating the operating state information of said specific household appliance and user notification information according to the characteristics of said specific appliance, appending a unique code assigned to said specific household appliance to the generated operating state information and user notification information, transmitting the resulting information through said insulation transformer, receiving said remote control information through said insulation transformer, extracting said unique code from the received remote control information and then processing said remote control information.

7. The apparatus as set forth in claim 6, wherein said screen display communication module further includes means for analyzing said user notification information and flickering information displayed on the screen or varying the color thereof if the analyzed result indicates an urgent situation.

8. A method for remotely controlling at least one household appliance, comprising the steps of:

a) controlling the operations of various components in said household appliance, checking operating states of said components and generating fault/repair information upon occurrence of a fault in said appliance;

b) performing a communication processing function and a signal coupling function to generate an automatic service call according to said fault/repair information generated at said step a);

c) gaining access to a service center over an Internet network using a unique identification code and transmitting fault/repair records to said service center; and d) allowing said service center to receive the transmitted fault/repair records if said unique identification code is valid and then to display a reception acknowledgement message containing information about a visit time of a repairman and the degree of said fault.

* * * * *